US012780107B2

(12) United States Patent
Castleman et al.

(10) Patent No.: US 12,780,107 B2
(45) Date of Patent: Nov. 3, 2026

(54) SYSTEMS, DEVICES, AND METHODS FOR TRUCK BED STORAGE

(71) Applicant: Toyota Motor Engineering & Manufacturing North America, Inc., Plano, TX (US)

(72) Inventors: William N. Castleman, Canton, MI (US); Matthew J. Mahaffy, Tipton, MI (US); Todd M. Hook, Brighton, MI (US); Robert C. MacArthur, Milan, MI (US)

(73) Assignees: TOYOTA MOTOR ENGINEERING & MANUFACTURING NORTH INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 84 days.

(21) Appl. No.: 18/907,357

(22) Filed: Oct. 4, 2024

(65) Prior Publication Data

US 2026/0097716 A1 Apr. 9, 2026

(51) Int. Cl.
*B60R 9/06* (2006.01)

(52) U.S. Cl.
CPC .................................... *B60R 9/065* (2013.01)

(58) Field of Classification Search
CPC ...................................................... B60R 9/065
USPC .......................................... 224/404; 296/37.6
See application file for complete search history.

(56) References Cited

U.S. PATENT DOCUMENTS 2,784,027 A * 3/1957 Temp ........................ B60P 3/32 296/156
4,573,731 A * 3/1986 Knaack ................... B60R 11/06 224/404
4,733,898 A * 3/1988 Williams ............... B62D 33/02 296/24.32
4,990,049 A 2/1991 Hargrove
5,845,952 A * 12/1998 Albertini ................... B60P 3/14 296/24.45

(Continued)

FOREIGN PATENT DOCUMENTS

DE 102004003405 A1 * 8/2005 ............. B60J 5/102

OTHER PUBLICATIONS

DE-102004003405-A1; Haudel, Elmar; Aug. 18, 2005 (Year: 2005).*
CA-2292293 A1; “Driver-Over Container For Truck Boxes and The Like”; Kenney, Scott; Jun. 15, 2001 (Year: 2001).*

(Continued)

*Primary Examiner* — Nathan J Newhouse
*Assistant Examiner* — Lester V Vanterpool
(74) *Attorney, Agent, or Firm* — Snell & Wilmer LLP

(57) ABSTRACT

Systems, devices, and methods for a truck bed storage system for a vehicle. The system may include a bed floor positioned along a first horizontal plane. The system may include a battery positioned underneath the bed floor. The system may include a storage bin lying along a second horizontal plane being substantially parallel to the first horizontal plane and positioned rearward of the battery with respect to the vehicle, the storage bin having a plurality of walls defining one or more storage compartments. The system may include a lid having a closed position. The lid may lay along the first horizontal plane to enclose the storage bin when the lid is in the closed position. The lid may have a ramp position. The lid may form an angled surface between the first horizontal plane and the second horizontal plane when the lid is in the ramp position.

20 Claims, 7 Drawing Sheets

(56) References Cited

U.S. PATENT DOCUMENTS

| | | | | | |
|---|---|---|---|---|---|
| 5,964,492 | A * | 10/1999 | Lyon | B60R 9/00 224/404 |
| 5,979,725 | A * | 11/1999 | Lehrman | B60R 7/02 220/23.88 |
| 5,996,868 | A * | 12/1999 | Paradis | B60R 9/00 224/539 |
| D426,187 | S * | 6/2000 | Shultz | D12/414.1 |
| 6,318,781 | B1 * | 11/2001 | Mc Kee | B60R 9/00 296/37.6 |
| 6,695,375 | B1 * | 2/2004 | May | B60R 11/06 224/403 |
| 6,880,875 | B2 * | 4/2005 | McClure | B62D 43/10 224/42.2 |
| 7,083,219 | B1 * | 8/2006 | Gregory | B60P 1/003 414/522 |
| 7,216,914 | B2 * | 5/2007 | Lovell | B60R 9/065 296/57.1 |
| 7,419,203 | B2 * | 9/2008 | Chandler | B60P 3/14 296/37.6 |
| 7,544,027 | B2 | 6/2009 | Barker | |
| 7,794,004 | B2 * | 9/2010 | Aebker | B60R 5/04 296/37.8 |
| 7,976,264 | B1 | 7/2011 | Pope | |
| 8,814,246 | B2 * | 8/2014 | Weller | B62D 33/042 296/57.1 |
| 9,527,454 | B2 | 12/2016 | Smith et al. | |
| 9,738,203 | B2 | 8/2017 | Michaud | |
| 9,994,263 | B1 | 6/2018 | Richter | |
| 10,029,598 | B2 * | 7/2018 | Keck | B60R 9/06 |
| 10,160,368 | B2 * | 12/2018 | Keck | B60R 9/06 |
| 10,974,656 | B2 * | 4/2021 | Keck | B60R 9/065 |
| 11,214,202 | B2 | 1/2022 | Carbone et al. | |
| 11,292,532 | B1 * | 4/2022 | Heinzelman | B60R 5/041 |
| 11,628,892 | B1 | 4/2023 | Fisher | |
| 11,643,288 | B2 * | 5/2023 | Harnack | B65G 69/30 206/521 |
| 11,858,402 | B2 | 1/2024 | Moore et al. | |
| 2004/0124653 | A1 * | 7/2004 | Grafton | B60R 9/00 296/37.6 |
| 2004/0174033 | A1 * | 9/2004 | Webb | B60R 9/00 296/37.6 |
| 2006/0061116 | A1 * | 3/2006 | Haaberg | B60P 3/14 296/37.6 |
| 2006/0284439 | A1 | 12/2006 | Carroll | |
| 2017/0138091 | A1 * | 5/2017 | Roatis | E05B 47/0045 |
| 2023/0143160 | A1 * | 5/2023 | Whitta | B65D 55/02 206/508 |
| 2025/0382018 | A1 * | 12/2025 | Williams | B62D 33/0207 |

OTHER PUBLICATIONS

DE 29814814 U1: “Foldable Ramp For Mini Bus Or Van Can Be Used For Transportation of Wheelchair”; Maubach, M.; Nov. 12, 1998 (Year: 1998).*

“Drawer System” from website Decked; 9 pages; printed on May 6, 2024; https://decked.com/products/drawers.

“Titan Ramps Raised ATV UTV Truck Bed Rack” item No. 332022 from website Discount Ramps; 5 pages; https://www.discountramps.com/atv/carriers/p/332022/.

“Ramp Slide 1800LBS” from website Cargoease; 4 pages.

“4x4 Heavy duty truck bed drawer truck storage drawer” from website Alibaba.com; Dongguan Lonman Auto Accessories Manufacturing Co., Ltd.; 11 pages; https://www.alibaba.com/product-detail.

* cited by examiner

SYSTEMS, DEVICES, AND METHODS FOR TRUCK BED STORAGE

BACKGROUND

1. Field

The present disclosure relates to systems, devices, and/or methods for truck bed storage.

2. Description of the Related Art

An electrified pickup truck (e.g., a battery electric vehicle (BEV) or a plug-in hybrid electric vehicle (PHEV)) may locate a battery pack in a front portion of a bed of the electrified pickup truck. This may improve battery capacity and range but worsens the utility of the electrified pickup truck. For example, the battery pack may result in the front portion of the bed being a raised shelf such that the bed is not level. This may make loading items (e.g., 4×8 foot boards, pallets, etc.) into the bed difficult. Alternatively, the battery pack may result in a floor of the bed being raised such that the bed is level, but also has a reduced storage area. Also, the battery pack in the front portion of the bed may provide excessive weight towards the front of the pickup truck.

Accordingly, it is desirable to provide systems, devices, and methods for truck bed storage.

SUMMARY

In general, one aspect of the subject matter described in this disclosure may be embodied in a truck bed storage system for a vehicle. The truck bed storage system may include a bed floor positioned along a first horizontal plane. The truck bed storage system may further include a battery positioned underneath the bed floor. The battery may be configured to store and supply electrical energy. The truck bed storage system may further include a storage bin lying along a second horizontal plane. The second horizontal plane may be substantially parallel to the first horizontal plane. The storage bin may be positioned rearward of the battery with respect to the vehicle. The storage bin may have a plurality of walls defining one or more storage compartments. The truck bed storage system may further include a lid. The lid may have a first closed position. The lid may be configured to lay along the first horizontal plane to enclose the storage bin when the lid is in the first closed position. The lid may further have a ramp position. The lid may be configured to form an angled surface between the first horizontal plane and the second horizontal plane when the lid is in the ramp position.

In one aspect, the subject matter may be embodied in a truck bed storage system for a vehicle. The truck bed storage system may include a bed floor positioned along a first horizontal plane. The truck bed storage system may further include a battery positioned underneath the bed floor. The battery may be configured to store and supply electrical energy. The truck bed storage system may further include a storage bin lying along a second horizontal plane. The second horizontal plane may be substantially parallel to the first horizontal plane. The storage bin may be positioned rearward of the battery with respect to the vehicle. The storage bin may have a plurality of walls defining one or more storage compartments. The truck bed storage system may further include a tailgate positioned rearward of the storage bin with respect to the vehicle. The tailgate may have an interior surface. The tailgate may further have a first closed position. The interior surface may be positioned perpendicular to the second horizontal plane when the tailgate is in the first closed position. The tailgate may further have a first open position. The interior surface may be positioned along the second horizontal plane when the tailgate is in the first open position. The truck bed storage system may further include a lid. The lid may have a second closed position. The lid may be configured to lay along the first horizontal plane to enclose the storage bin when the lid is in the second closed position. The lid may further have a second open position. The lid may be configured to be positioned perpendicular to the first horizontal plane when the lid is in the second open position. The lid may further have a ramp position. The lid may be configured to form an angled surface between the first horizontal plane and the second horizontal plane when the lid is in the ramp position.

BRIEF DESCRIPTION OF THE DRAWINGS

Other systems, methods, features, and advantages of the present disclosure will be apparent to one skilled in the art upon examination of the following figures and detailed description. Component parts shown in the drawings are not necessarily to scale and may be exaggerated to better illustrate the important features of the present disclosure. In the drawings, like reference numerals designate like parts throughout the different views.

DETAILED DESCRIPTION

Disclosed herein are systems, devices, methods, and/or vehicles for implementing a truck bed storage system. The truck bed storage system may include a storage bin and a lid. The storage bin and the lid may be positioned at a rear portion of a bed of a vehicle. The truck bed storage system may be positioned in a stepped-down portion of the bed (e.g., that is formed by a battery underneath a bed floor of a front portion of the bed). Particular embodiments of the subject matter described in this disclosure may be implemented to realize one or more of the following advantages. The lid may be coplanar with the bed floor when the lid is in a closed position such that the truck bed storage system may provide for a level bed floor while also increasing a storage capacity of the vehicle by holding one or more objects (e.g., electric and/or nonelectric tools) in the storage bin. The level bed floor may improve the ease of loading objects into the bed, for example.

Moreover, the lid may be moved manually (e.g., via a user) and/or automatically (e.g., via one or more lid actuators) between the closed position and an open position to enclose the storage bin and enable access to the storage bin. In addition, the lid may act as a bed divider when in the open position to divide the bed into a front portion and a rear portion thereby providing additional organization options for a user, for example.

Moreover, the lid may further have a ramp position for improving the ease of loading objects into the bed. In the ramp position, the lid may form a ramp between the bed floor and an interior surface of a tailgate of the vehicle when the tailgate is opened. Thus, the objects (e.g., a pallet) may be pushed up or down the ramp formed by the lid to load or unload the objects from the bed.

Moreover, the storage bin may be moved manually (e.g., via the user) and/or automatically (e.g., via one or more storage bin actuators) between a closed position and an open position to enclose the storage bin and enable access to the storage bin. The storage bin may move or slide over the open tailgate to improve access to the storage bin, for example.

Figure 1:
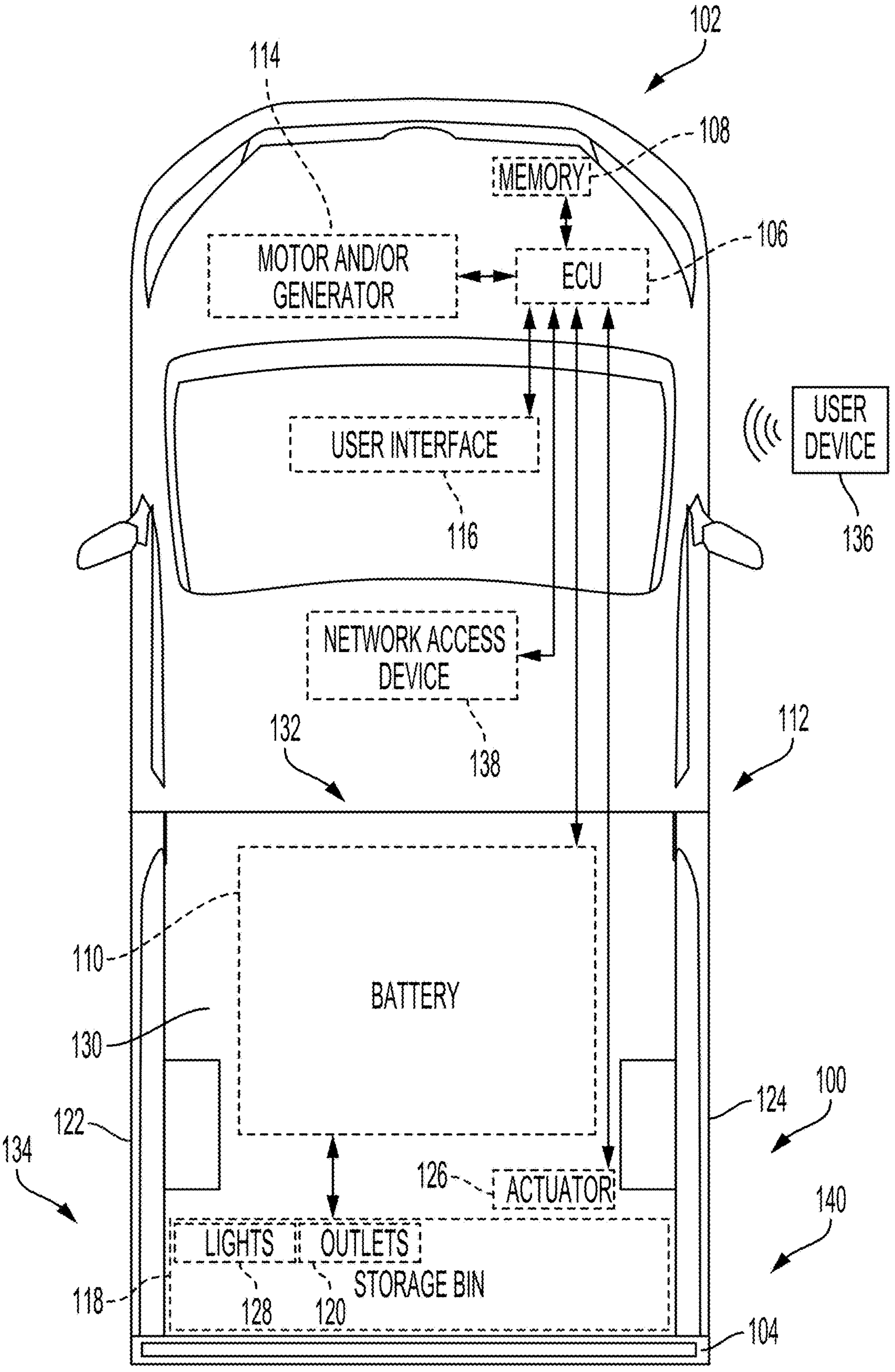
FIG. 1 is a schematic of an example vehicle with which an example storage system may be implemented according to an aspect of the disclosure.

FIG. 1 illustrates an example vehicle 102 in which an example storage system 100 (also may be referred to as a truck bed storage system 100) may be implemented. The storage system 100 may be retrofitted, coupled to, include, or be included within the vehicle 102 or separate from the vehicle 102. The vehicle 102 may be a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery, or fuel cell driven vehicle. For example, the vehicle 102 may be an electric vehicle, a hybrid vehicle, a plug-in hybrid vehicle, a hydrogen fuel cell vehicle, or any other type of vehicle. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

The vehicle 102 and/or the storage system 100 may further include a tailgate 104 and/or a bed (or truck bed or cargo area) 112. The tailgate 104 may be positioned at or near a rear end of the vehicle 102 and/or a rear portion 134 of the bed 112. The tailgate 104 may be moveably coupled to the rear end of the vehicle 102 and/or the rear portion 134 of the bed 112. The tailgate 104 may include an interior surface (or panel) 212 (marked in FIG. 2). The interior surface 212 may form a portion of the bed 112 (e.g., a rear wall of the bed 112). The tailgate 104 may be configured to open and close and may have an open position 216 (marked in FIG. 2) and a closed position 140. The interior surface 212 may be positioned perpendicular to a first horizontal plane 604 (marked in FIG. 6) when the tailgate 104 is in the closed position 140. The interior surface 212 may be positioned along the first horizontal plane 604 when the tailgate 104 is in the open position 216.

The bed 112 may have a front portion 132 and the rear portion 134 opposite of the front portion 132. The bed 112 may have a bed floor (or trunk floor) 130 and a plurality of bed sides (or rear quarter panels) including a left bed side 122 and a right bed side 124. The bed floor 130 may define and/or be positioned along a second horizontal plane 602 (marked in FIG. 6) with the second horizontal plane 602 being substantially parallel to the first horizontal plane 604 (marked in FIG. 6). The bed floor 130 may be positioned forward of the tailgate 104 with respect to the vehicle 102. The bed floor 130 may be raised to accommodate a battery 110 and/or the storage system 100.

The vehicle 102 and/or the storage system 100 may further include a motor and/or generator 114 and/or the battery 110. The motor and/or generator 114 may be located within an engine bay of the vehicle 102. In examples, the motor and/or generator 114 may be located at and/or adjacent to one or more axles of the vehicle 102 such that the vehicle 102 includes one motor and/or generator or a plurality of motors and/or generators. The motor and/or generator 114 may be an internal combustion engine (ICE). In this regard, the motor and/or generator 114 may combust an air and fuel mixture to provide power to the vehicle 102 and/or components of the vehicle 102 and/or the storage system 100. Accordingly, the motor and/or generator 114 can cause the vehicle 102 to accelerate, decelerate, or maintain a desired velocity. The motor and/or generator 114 may include combinations of an ICE and an electric motor, such as for hybrid electric vehicle (HEV) applications, for example. In examples, the motor and/or generator 114 may be an electric motor, such as for battery electric vehicle (BEV) applications, for example. In this regard, the motor and/or generator 114 may be an electric motor and an electric generator that converts electrical energy into mechanical power, such as torque, and converts mechanical power into electrical energy. The motor and/or generator 114 may be electrically connected to the battery 110. The motor and/or generator 114 may convert energy from the battery 110 into mechanical power, and may provide energy back to the battery 110, for example, via regenerative braking.

Figure 6:
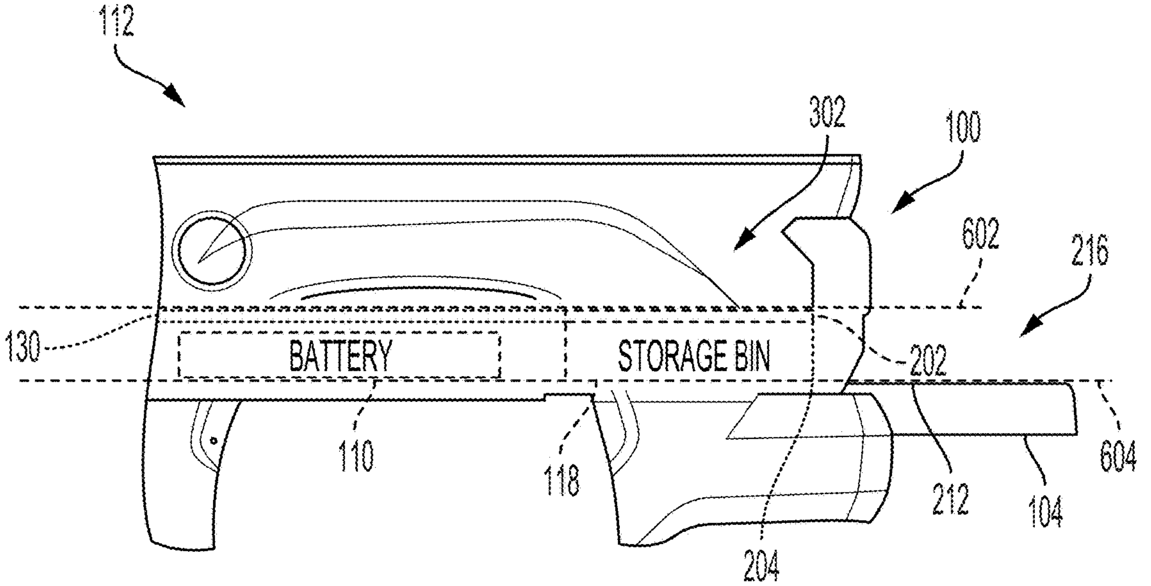
FIG. 6 is a side view of the storage system of FIG. 1 and a rear portion of the vehicle of FIG. 1 with portions of the storage system and/or the vehicle not shown to better illustrate certain features of the storage system according to an aspect of the disclosure.

The battery 110 may be retrofitted, coupled to, include or be included within the vehicle 102. The battery 110 may be electrically connected to the motor and/or generator 114 and/or other components of the vehicle 102 and/or the storage system 100. The battery 110 may be located at or near the front portion 132 of the bed 112 and underneath the bed floor 130 (as shown in FIG. 6, for example). The battery 110 may have increased impact protection (e.g., from a rear-end collision) by being positioned in the front portion 132 of the bed 112 and not the rear portion 134 of the bed 112. The battery 110 may be positioned along the first horizontal plane 604 (marked in FIG. 6). The battery 110 may store chemical energy for later conversion to electrical energy. The battery 110 may provide the electrical energy to and/or receive electrical energy from the motor and/or generator 114 and/or other components of the vehicle 102. The battery 110 may provide electrical energy to the storage system 100, in examples. The battery 110 may be a battery pack that includes one or more battery modules, a cooling system, and/or a power management system (BMS). The one or more battery modules may each include one or more cells. The one or more cells may be cylindrical cells, prismatic cells, and/or pouch cells (in examples, other types of cells may be used). A chemistry of the one or more cells may be lithium ion (Li-Ion), nickel manganese cobalt (NMC), nickel metal hydride (Ni—MH), lithium sulfur (Li—S), and/or lead-acid (in examples, other chemistries may be used).

In examples, the vehicle 102 and/or the storage system 100 may further include an electronic control unit (ECU) 106, a memory 108, a user interface 116, and/or a network access device 138. The ECU 106 may be implemented as a single ECU or in multiple ECUs. The ECU 106 may be electrically connected to some or all of the components of the vehicle 102 and/or the storage system 100. For example, the ECU 106 may be electrically connected to the motor and/or generator 114, the battery 110, the memory 108, the user interface 116, and/or the network access device 138. The ECU 106 may include one or more processors (or controllers) specifically designed for controlling operations of the vehicle 102, such as accelerating, braking, lighting, etc.

The memory 108 may store instructions to execute on the ECU 106 and may include one or more of a random access memory (RAM) or other volatile or non-volatile memory. The memory 108 may be a non-transitory memory or a data storage device, such as a hard disk drive, a solid-state disk drive, a hybrid disk drive, or other appropriate data storage, and may further store machine-readable instructions, which may be loaded and executed by the ECU 106. The memory 108 may store vehicle parameters (e.g., vehicle weight, transmission gear information, etc.).

The user interface 116 may be located within a cabin of the vehicle 102 (e.g., coupled to a dashboard of the vehicle 102). The user interface 116 may provide an interface to a user (e.g., a driver and/or a passenger) of the vehicle 102 to interact with and/or receive output from the ECU 106. The user interface 116 may have a user interface element, such as a screen and/or a touchscreen with a button, a switch, a microphone, a speaker, a gesture monitoring sensor, a knob, a graphical user interface (GUI), and/or other input/output devices electrically connected to the ECU 106 to provide input and/or output of information (or data) to and/or from the ECU 106.

The network access device 138 may be electrically connected to the ECU 106 and may include a communication port or channel, such as one or more of a Wi-Fi unit, a Bluetooth® unit, a Radio Frequency Identification (RFID) tag or reader, a DSRC unit, and/or a cellular network unit for accessing a network (e.g., CDMA, GSM, 3G, 4G, 5G, etc.). The network access device 138 may transmit data to and receive data from devices and systems not directly connected to the vehicle 102. For example, the ECU 106 may communicate with a user device 136 (e.g., a key fob of the vehicle 102 and/or a mobile device of a user (e.g., an owner of the vehicle 102) such as a phone, a tablet, etc.) via the network access device 138.

Figure 2:
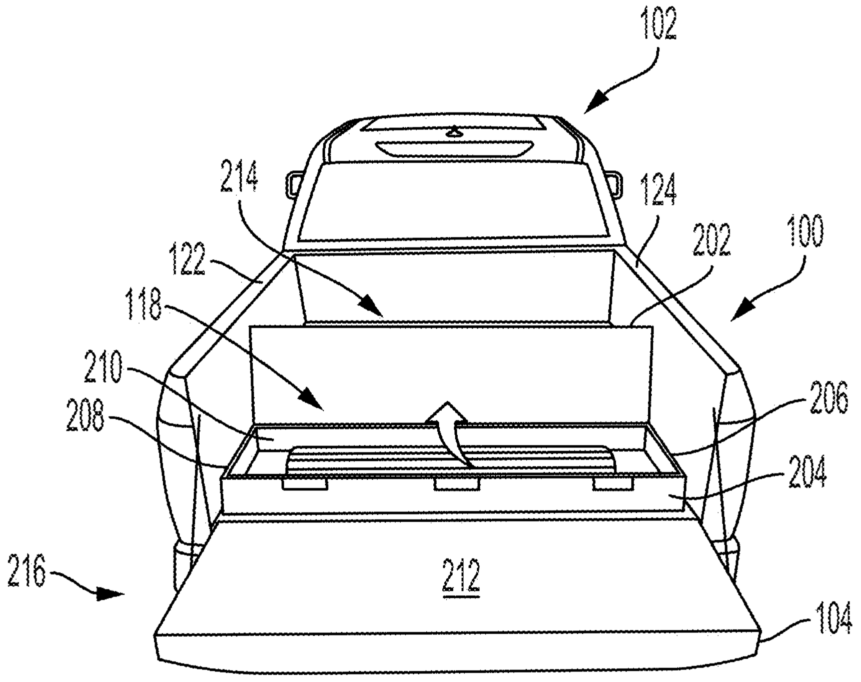
FIG. 2 is a perspective rear view of the vehicle of FIG. 1 including the storage system of FIG. 1 and illustrating a lid of the storage system in an open position according to an aspect of the disclosure.
Figure 3:
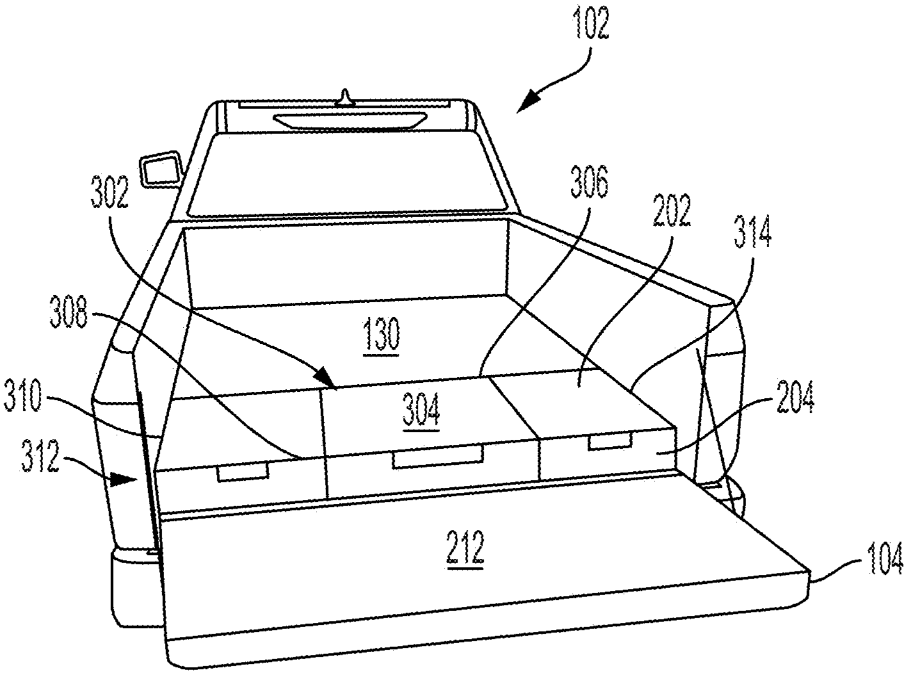
FIG. 3 is a perspective rear view of the vehicle of FIG. 1 including the storage system of FIG. 1 and illustrating the lid of the storage system in a closed position according to an aspect of the disclosure.

FIGS. 2 and 3 each illustrate rear perspective views of the vehicle 102 including the storage system 100. Referencing FIGS. 2 and 3 with continuing reference to FIG. 1, the storage system 100 may include a storage bin 118 and a lid 202. The storage bin 118 may be positioned between the left bed side 122 and the right bed side 124 of the vehicle 102 and/or underneath the bed floor 130 and/or the second horizontal plane 602 (marked in FIG. 6). For example, the storage bin 118 may be positioned along the first horizontal plane 604 (marked in FIG. 6). In examples, the storage bin 118 may be positioned between the battery 110 and the tailgate 104. The storage bin 118 may be adjacent to and/or rearward of the battery 110 with respect to the vehicle 102.

The storage bin 118 may be configured (or sized) to store and/or hold one or more objects (e.g., tools, a spare tire, etc.). The storage bin 118 may be a substantially rectangular box having a plurality of walls (or sides) with the plurality of walls and the lid 202 defining one or more storage compartments of the storage bin 118. The plurality of walls may include a rear wall 204, a floor (or bottom) 702 (marked in FIG. 7), a left wall (or side) 208, a right wall (or side) 206, and/or a front wall (or side) 210. The left wall 208 and the right wall 206 may define a width of the storage bin 118. The lid 202 may be movably coupled (e.g., via one or more hinges) to the front wall 210 and/or the bed floor 130, for example. The lid 202 may have a front edge 306 (marked in FIG. 3) and a rear edge 308 (marked in FIG. 3) that is opposite the front edge 306. The front edge 306 and the rear edge 308 may define a length of the lid 202. The lid 202 may have a left edge 310 and a right edge 314 opposite the left edge 310. The left edge 310 and the right edge 314 may define a width of the lid 202.

The lid 202 may have an open position 214 as shown in FIG. 2 and a closed position 302 as shown in FIG. 3. In the open position 214, the lid 202 may be positioned at an angle relative to the bed floor 130 and/or the second horizontal plane 602 (marked in FIG. 6). For example, the lid 202 may be positioned perpendicular (or substantially perpendicular) to the bed floor 130 and/or the second horizontal plane 602 when in the open position 214. The one or more storage compartments of the storage bin 118 may be accessible (e.g., to place tools into and/or take tools out of the one or more storage compartments) when the lid 202 is in the open position 214. The lid 202 may be configured to pivot or swing upwards from the closed position 302 to the open position 214 as shown by the arrow in FIG. 2, for example.

In the closed position 302, the lid 202 may enclose the one or more storage compartments of the storage bin 118 (e.g., to secure the contents of the storage bin 118). The lid 202 may lay along the second horizontal plane 602 (marked in FIG. 6) when in the closed position 302. Accordingly, the lid 202 and the bed floor 130 may be positioned along the same plane (e.g., the second horizontal plane 602) when the lid 202 is in the closed position 302 as shown in FIG. 3, for example. When in the closed position 302, a top (or first) surface 304 of the lid 202 and the bed floor 130 may form a level and/or continuous bed floor of the vehicle 102. In examples, the top surface 304 of the lid 202 may have similar features and/or a similar look to the bed floor 130.

For example, the top surface 304 may have undulations, grooves, and/or one or more coatings (e.g., paint, a bed liner, etc.) that are the same as or similar to the bed floor 130.

In examples, the storage bin 118 may be waterproof when the lid 202 is in the closed position 302. For example, the storage bin 118 may include one or more gaskets or seals on the lid 202 and/or the plurality of walls 204, 206, 208, and 210 (e.g., on a bottom surface of the lid 202 and/or a top surface of the plurality of walls 204, 206, 208, and 210). In examples, the storage bin 118 may be water resistant and/or may include one or more drain holes in the rear wall 204, the floor 702, the left wall 208, the right wall 206, and/or the front wall 210 to enable drainage of water or other liquid that enters the storage bin 118.

Figure 4:
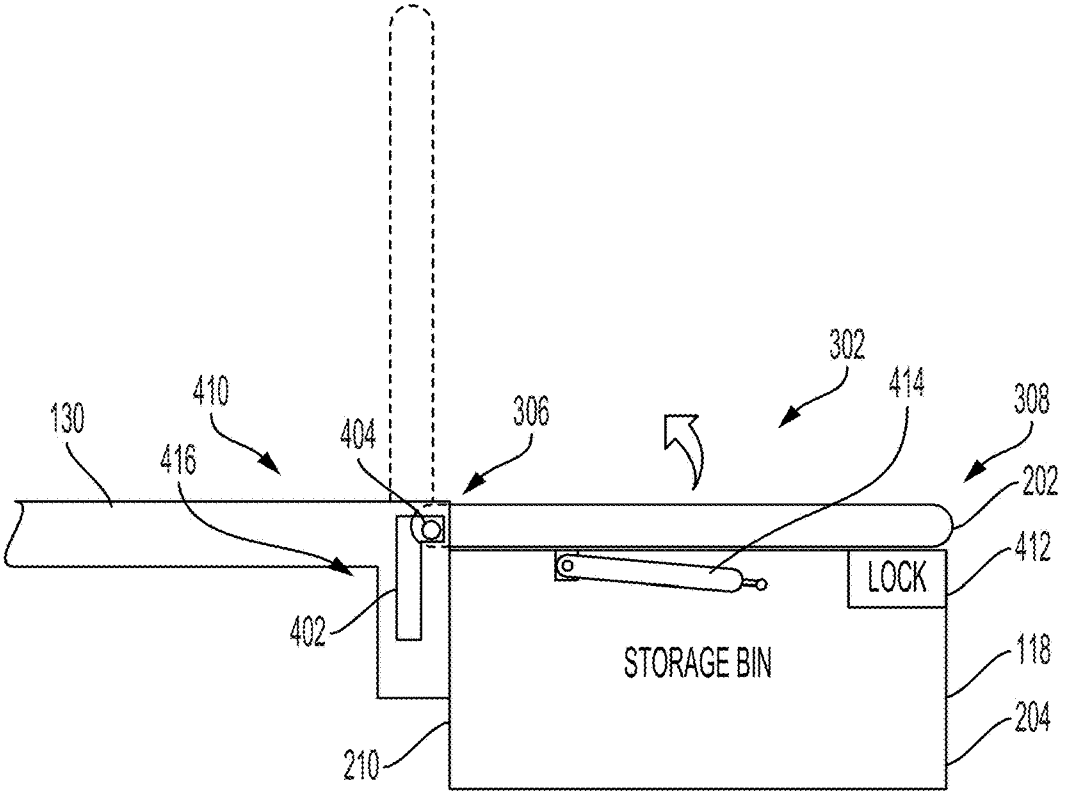
FIG. 4 is a side view of the storage system of FIG. 1 and a bed floor of the vehicle of FIG. 1 with portions of the storage system and/or the vehicle not shown to better illustrate certain features of the storage system according to an aspect of the disclosure.
Figure 5:
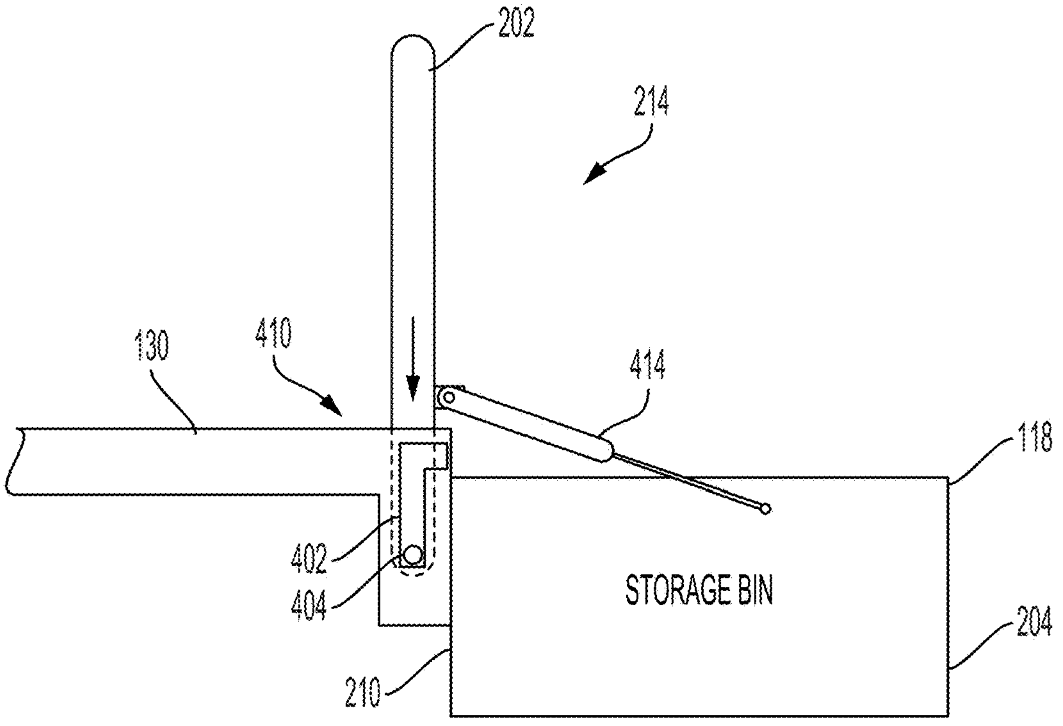
FIG. 5 is a side view of the storage system of FIG. 1 and the bed floor of the vehicle of FIG. 1 with portions of the storage system and/or the vehicle not shown to better illustrate certain features of the storage system according to an aspect of the disclosure.

FIGS. 4 and 5 illustrate side views of the storage system 100 with portions of the vehicle 102 and/or the storage system 100 not shown to better illustrate certain features of the storage system 100. Referring to FIGS. 4 and 5 with continuing reference to FIG. 1, in examples, the lid 202 may be configured to slide between the front wall 210 of the storage bin 118 and a rear end 410 of the bed floor 130 when in the open position 214. This may hold the lid 202 in the open position 214 and/or dived the bed 112 into a front section and a rear section (e.g., to organize contents of the bed 112).

The lid 202 may be configured to pivot or swing upwards (e.g., away from the storage bin 118) from the closed position 302 such that the lid 202 is perpendicular to the bed floor 130 as shown in FIG. 4. The lid 202 may slide downward (or be pushed downward) along the front wall 210 of the storage bin 118 and into a cavity 416 such that the lid 202 is held in the open position 214 (e.g., the lid 202 may be prevented from closing to the closed position 302). The cavity 416 may be positioned between the front wall 210 and the rear end 410 of the bed floor 130, for example. The cavity 416 may be positioned forward of the storage bin 118 with respect to the vehicle 102, for example.

In examples, the rear edge 308 of the lid 202 may be level with (or below) top surfaces of the left bed side 122 and/or the right bed side 124 when the lid 202 is within the cavity 416. This may allow large objects (e.g., drywall sheets) to be placed across the top surfaces of the bed sides 122 and 124 even when the lid 202 is in the open position 214, for example.

In examples, the storage system 100 may further include one or more lid actuators 414. The one or more lid actuators 414 may be coupled to the lid 202, the storage bin 118 (e.g., the left wall 208 and/or the right wall 206), the left bed side 122, and/or the right bed side 124. The one or more lid actuators 414 may be and/or include electric linear actuators, pneumatic and/or hydraulic cylinders, metal springs, and/or gas springs, for example. The one or more lid actuators 414 may actuate the lid 202 such that the lid 202 may move between the closed position 302 and the open position 214. For example, the one or more lid actuators 414 may help to reduce an amount of force required to move the lid 202 between the closed position 302 and the open position 214 and/or may automate moving the lid 202 between the closed position 302 and the open position 214.

In examples, the one or more lid actuators 414 may be electrically connected to the battery 110 and/or the ECU 106. The one or more lid actuators 414 may be configured to automatically move the lid 202 between the closed position 302 and the open position 214 when activated (e.g., via the ECU 106). For example, a user may use the user device 136 to send an open signal or a close signal to the vehicle 102. The ECU 106 may receive, via the network access device 138, the open signal or the close signal from the user device 136. The ECU 106 may control the one or more lid actuators 414 to automatically open or close the lid 202 based on the received open signal or the received close signal. In examples, the user may use the user interface 116 and/or other buttons or switches (or other input devices) coupled to the storage bin 118, the lid 202, the tailgate 104, and/or the vehicle 102 to activate the one or more lid actuators 414 to automatically open or close the lid 202.

In examples, the storage system 100 may further include one or more channels (or tracks) 402. For example, the one or more channels 402 may include a left channel positioned proximate to and/or integrated with the left bed side 122 and a right channel positioned proximate to and/or integrated with the right bed side 124. The lid 202 may include one or more pins 404 that are configured to slide within the one or more channels 402. The one or more pins 404 may be positioned at the front edge 306 of the lid 202 and may protrude outward from the left edge 310 (marked in FIG. 3) and/or the right edge 314 (marked in FIG. 3) of the lid 202, for example. In examples, the one or more pins 404 may be and/or include one or more bushings, one or more bearings, and/or one or more cam followers. As shown in FIGS. 4 and 5, the one or more channels 402 may guide the one or more pins 404 such that the lid 202 may pivot upwards from the closed position 302 (e.g., until the lid 202 is perpendicular to the bed floor 130), and slide downward into the cavity 416 such that the lid 202 is held in the open position 214.

In examples, the storage system 100 may further include a lock 412. The lock 412 may be implemented as a single lock or a plurality of locks. The lock 412 may be coupled to the lid 202, the storage bin 118 (e.g., the rear wall 204), and/or the tailgate 104, for example. The lock 412 may be configured to lock the lid 202 in the closed position 302 to secure the contents of the storage bin 118. The lock 412 may be and/or include a manual lock that is configured to be locked and unlocked with a physical key. In examples, the lock 412 may be and/or include an electronic lock that is configured to be locked or unlocked when controlled by the ECU 106 of the vehicle 102.

For example, the lock 412 may be configured to lock or unlock the lid 202 in response to user input that is received via the user interface 116. In examples, the lock 412 may be wirelessly locked and unlocked via the user device 136. For example, a user (e.g., an owner of the vehicle 102) may use the user device 136 to send a lock signal or an unlock signal to the vehicle 102. The ECU 106 may receive, via the network access device 138, the lock signal or the unlock signal from the user device 136. The ECU 106 may control the lock 412 to lock or unlock the lid 202 based on the received lock signal or the received unlock signal. The lock 412 may be and/or include a tailgate lock such that the tailgate 104 and the lid 202 are both locked or unlocked via the same lock. In examples, the lock 412 may be separate from the tailgate lock such that the lid 202 may be locked or unlocked independently from the tailgate 104.

Figure 7:
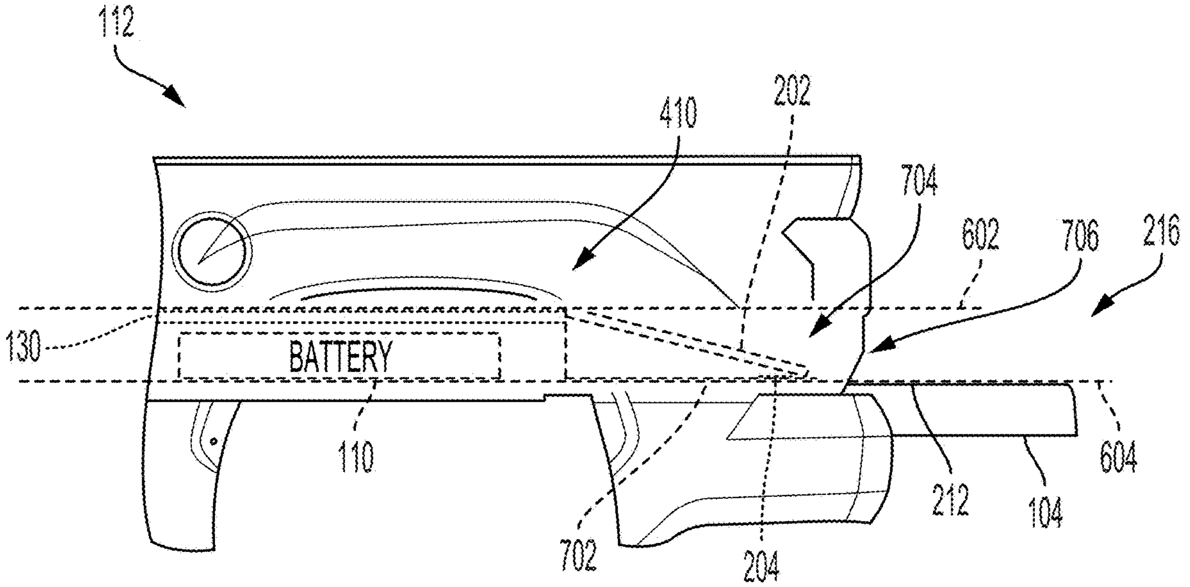
FIG. 7 is a side view of the storage system of FIG. 1 and the rear portion of the vehicle of FIG. 1 with portions of the storage system and/or the vehicle not shown to better illustrate certain features of the storage system according to an aspect of the disclosure.

FIGS. 6 and 7 illustrate side views of the storage system 100 with portions of the vehicle 102 and/or the storage system 100 not shown to better illustrate certain features of the storage system 100. Referring to FIGS. 6 and 7 with continuing reference to FIG. 1, FIG. 6 illustrates the lid 202 in the closed position 302 with the lid 202 positioned along the second horizontal plane 602. As shown in FIG. 6, when the tailgate 104 is in the open position 216, the interior surface 212 of the tailgate 104 may lay along the first horizontal plane 604. Thus, the bed floor 130 and the lid 202 may not be level with the interior surface 212 of the tailgate

104 when the tailgate 104 is in the open position 216 and the lid 202 is in the closed position 302. For example, a step may be formed between the interior surface 212 of the tailgate 104 and the lid 202 and/or the bed floor 130. This step may make loading certain objects (e.g., pallets, bikes, etc.) into the bed 112 more difficult (e.g., because the objects may not slide or roll from the interior surface 212 to the bed floor 130). To improve the ease of loading objects into the bed 112, the lid 202 may further include a ramp position 704 as shown in FIG. 7. In the ramp position 704, the lid 202 may form an angled surface between the second horizontal plane 602 and the first horizontal plane 604. For example, the lid 202 may form a ramp between the rear end 410 of the bed floor 130 and a front end 706 of the tailgate 104 when in the ramp position 704. This may improve the ease of loading the objects by enabling the objects to slide or roll from the interior surface 212 of the tailgate 104 up the ramp formed by the lid 202, and onto the bed floor 130.

In examples, before the lid 202 is placed in the ramp position 704, the rear wall 204 of the storage bin 118 may be folded downward toward the floor 702 of the storage bin 118, the interior surface 212 of the tailgate 104, and/or the first horizontal plane 604. This may allow the lid 202 to pivot or swing downward to the ramp position 704 as shown in FIG. 7, for example.

Figure 8:
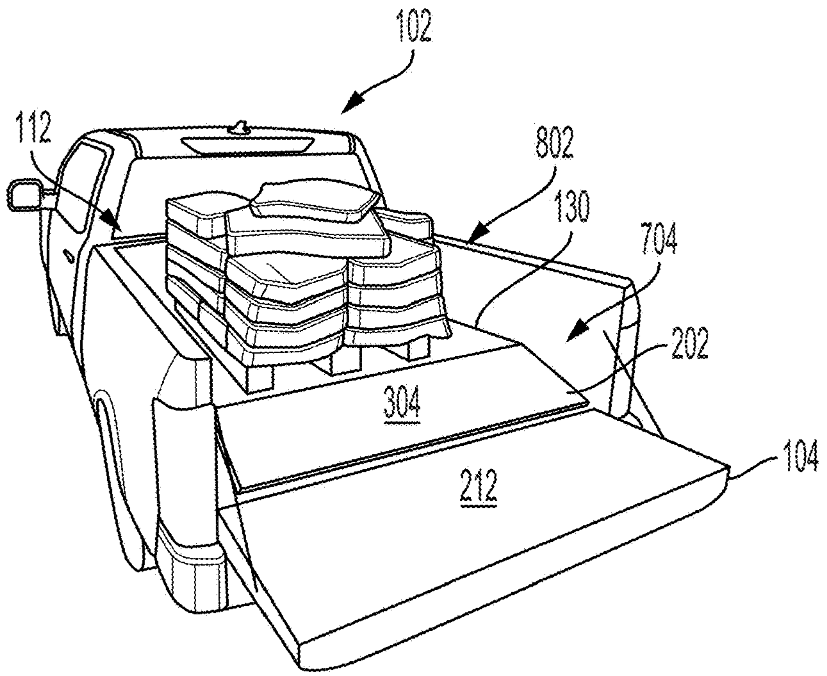
FIG. 8 is a perspective rear view of the vehicle of FIG. 1 including the storage system of FIG. 1 and illustrating the lid of the storage system in a ramp position according to an aspect of the disclosure.

FIG. 8 is a perspective rear view of the vehicle 102 and illustrates the lid 202 in the ramp position 704. As shown in FIG. 8, the lid 202 may eliminate a step (e.g., as seen in FIG. 3) between the interior surface 212 of the tailgate 104 and the bed floor 130 such that objects, such as a pallet 802, may be more easily loaded into the bed 112 of the vehicle 102.

Figure 9:
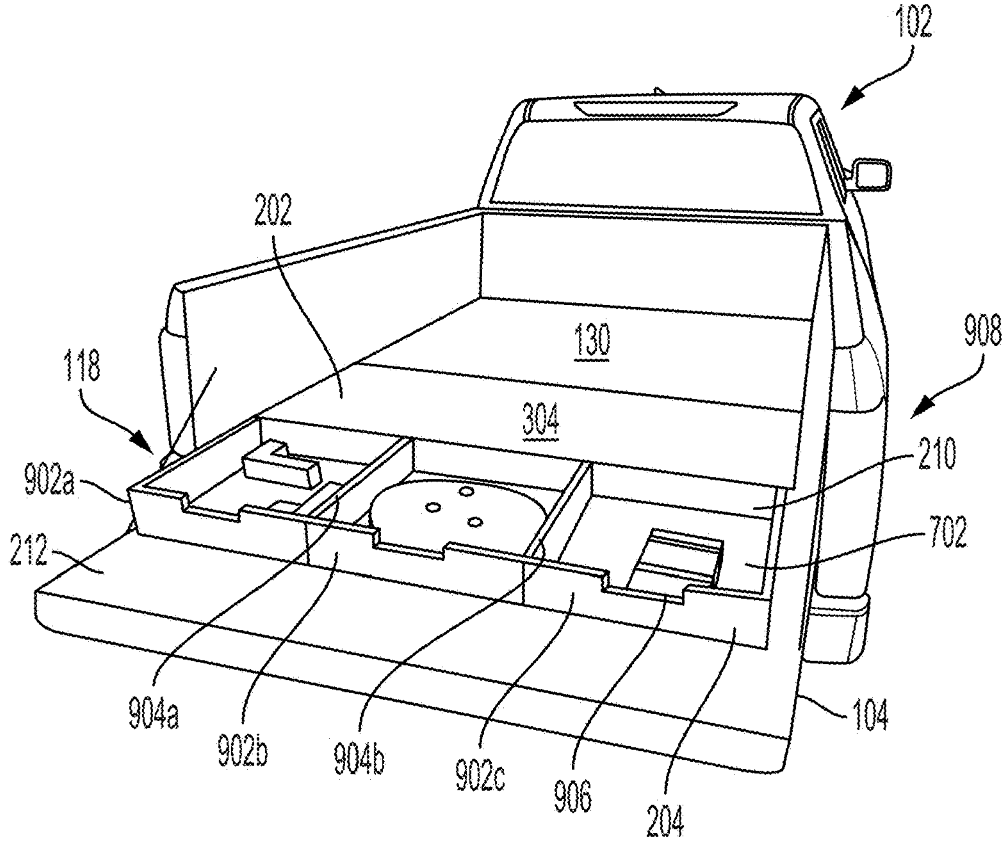
FIG. 9 is a perspective rear view of the vehicle of FIG. 1 including the storage system of FIG. 1 and illustrating a storage bin of the storage system in an open position according to an aspect of the disclosure.

FIG. 9 is a perspective rear view of the vehicle 102 including the storage system 100. In examples, the storage bin 118 may be a drawer such that the storage bin 118 has a closed position 312 as shown in FIG. 3 and an open position 908 as shown in FIG. 9. The storage bin 118 may be configured to move (or slide along rails) between the closed position 312 and the open position 908. The storage bin 118 may move or slide rearward from the closed position 312 with respect to the vehicle 102 when moving toward the open position 908. For example, the storage bin 118 may slide upon or above the interior surface 212 of the open tailgate 104 when moving toward the open position 908. This may improve the ease of accessing the storage bin 118 (e.g., to place objects into and/or take objects out of the storage bin 118) when a user is standing behind the open tailgate 104, for example.

In the closed position 312 (marked in FIG. 3), the storage bin 118 may be enclosed and/or covered by the lid 202 such that contents of the storage bin 118 are secured. For example, the one or more storage compartments of the storage bin 118 may be enclosed by the lid 202 when the storage bin 118 is in the closed position 312 and the lid 202 is in the closed position 302. When the storage bin 118 is moved or slid to the open position 908, the storage bin 118 may move or slide out from underneath the closed lid 202 such that the storage bin 118 is not enclosed and/or covered by the lid 202. Thus, the one or more storage compartments of the storage bin 118 may be accessed (e.g., to place objects into and/or take objects out of the storage bin 118) when the lid 202 is in the open position 214 as shown in FIG. 2, for example, and/or when the storage bin 118 is in the open position 908 as shown in FIG. 9, for example.

In examples, the lock 412 (marked in FIG. 4) may lock the storage bin 118 in the closed position 312 to secure the contents of the storage bin 118 in the same or similar manner as discussed with respect to the lid 202. In examples, the lock 412 may lock the storage bin 118 in the closed position 312 and the lid 202 in the closed position 302 to secure the contents of the storage bin 118. For example, the lock 412 may be configured to lock or unlock the lid 202 and the storage bin 118 simultaneously (in examples, the lock 412 may independently lock or unlock the lid 202 and the storage bin 118).

The storage bin 118 may be configured to move or slide between the closed position 312 (marked in FIG. 3) and the open position 908 as a single drawer. Moreover, the storage bin 118 may include one or more dividers (or inner walls) that are configured to divide the one or more storage compartments of the storage bin 118 into a plurality of storage compartments. For example, the storage bin 118 may include a first divider **904*a* and a second divider 904*b* such that the storage bin 118 includes three storage compartments (in examples, the storage bin 118 may include no dividers, one divider, or more than two dividers). In examples, the one or more dividers 904*a* and 904*b* may be added or removed by a user as desired (e.g., to accommodate long objects and/or to organize small objects). Moreover, the storage bin 118 may include a plurality of locations to place the one or more dividers 904*a* and 904*b* such that the user may change the quantity and/or the size of the plurality of storage compartments of the storage bin 118. For example, the storage bin 118 may include a plurality of divider slots within the front wall 210, the rear wall 204, and/or the floor 702 with the plurality of divider slots each being configured to receive and hold a respective divider of the one or more dividers 904*a* and 904*b***.

In examples, the storage bin 118 may further include one or more handles 906. The one or more handle 906 may be configured as a grabbing area for a user to grab onto to pull the storage bin 118 open and/or to push the storage bin 118 closed, for example. The one or more handles 906 may be and/or include one or more hand slots that are a sealed recess in the rear wall 204 of the storage bin 118. Thus, the storage bin 118 may be waterproof even with the addition of the one or more hand slots. In examples, the one or more handles 906 may be and/or include one or more grab handles. The one or more handles 906 may include one or more buttons (or other input devices) that are configured to latch or unlatch the storage bin 118. For example, the storage system 100 may further include one or more mechanical or electronic latches that are configured to hold the storage bin 118 in the closed position 312 and/or the open position 908 until a user presses the one or more buttons on the one or more handles 906. In addition or alternatively, in examples, the one or more buttons on the one or more handles 906 may be configured to lock or unlock the storage bin 118 and/or the lid 202 (e.g., via the lock 412) when the vehicle 102 detects (e.g., via the ECU 106 and/or the network access device 138) that the user device 136 is within a predetermined distance of the vehicle 102 (e.g., 3 feet, 5 feet, etc.).

In examples, the storage bin 118 may be and/or include a plurality of drawers. For example, the storage bin 118 may include a first drawer **902*a*, a second drawer 902*b*, and/or a third drawer 902*c* (in examples, the storage bin 118 may include two drawers or more than three drawers or may be one drawer as discussed above). The plurality of drawers 902*a-c* may each be configured to move between a closed position and an open position similar to the closed position 312 shown in FIG. 3 and the open position 908 shown in FIG. 9. In examples, the plurality of drawers 902*a-c* may be independently locked and unlocked (e.g., via the lock 412 (marked in FIG. 4)). In examples, the plurality of drawers 902*a-c* may be configured to be removably coupled to each other (e.g., via one or more latches, one or more clips, etc.). For example, the plurality of drawers 902***a-c* may be removably coupled together such that the plurality of drawers 902*a-c* may move or slide together as a single drawer. As another example, the first drawer 902*a* or the third drawer 902*c* may be removably coupled to the second drawer 902*b* such that the first drawer 902*a* or the third drawer 902*c* forms a larger drawer with the second drawer 902*b*.

Figure 10:
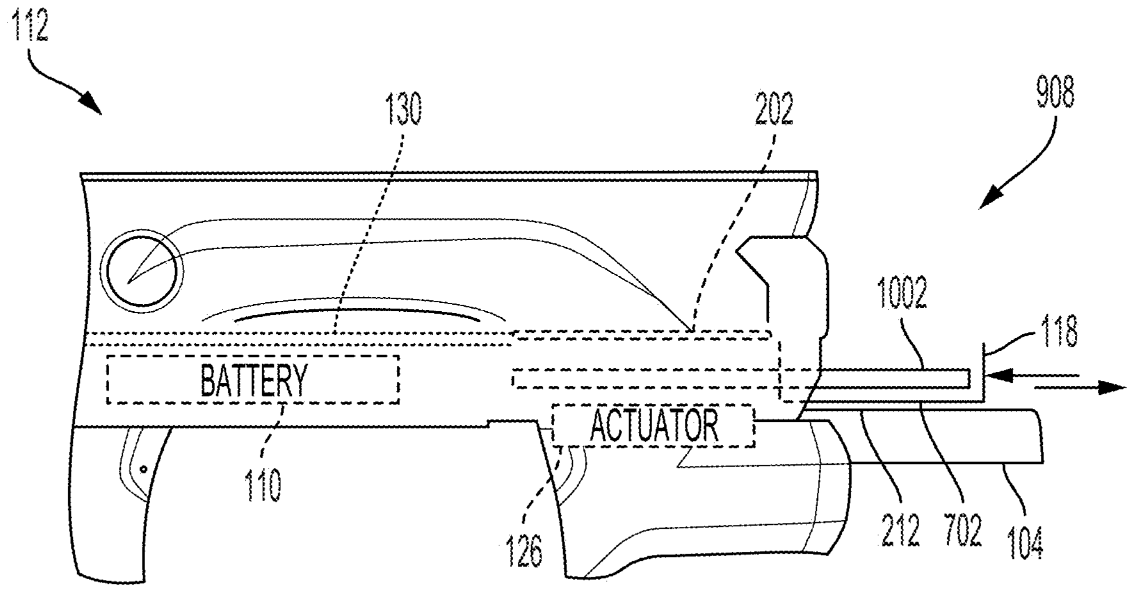
FIG. 10 is a side view of the storage system of FIG. 1 and the rear portion of the vehicle of FIG. 1 with portions of the storage system and/or the vehicle not shown to better illustrate certain features of the storage system according to an aspect of the disclosure.

FIG. 10 illustrates a side view of the vehicle 102 including the storage system 100 with some components of the vehicle 102 and/or the storage system 100 not shown to better illustrate certain features of the storage system 100. Referring to FIG. 10 with continuing reference to FIG. 1, in examples, the storage system 100 may further include one or more rails 1002. The one or more rails 1002 may movably couple the storage bin 118 to the vehicle 102. For example, the one or more rails 1002 may be coupled to the left wall 208 (marked in FIG. 2), the right wall 206 (marked in FIG. 2), and/or the floor 702 of the storage bin 118 and the left bed side 122, the right bed side 124, and/or the rear end of the vehicle 102. The one or more rails 1002 may be configured to guide the storage bin 118 between the closed position 312 (marked in FIG. 3) and the open position 908 (e.g., when a user pulls or pushes the storage bin 118). In examples, the one or more rails 1002 may be configured to manually or automatically lock or hold the storage bin 118 in place in the closed position 312, and/or the open position 908 (e.g., until the one or more buttons on the one or more handles 906 (marked in FIG. 9) are pressed by a user) such that the storage bin 118 may not unintentionally move between the closed position 312 and the open position 908.

In examples, the storage system 100 may further include one or more storage bin actuators (or motors) 126. The one or more storage bin actuators 126 may be coupled to the one or more rails 1002 and/or the storage bin 118. The one or more storage bin actuators 126 may be electrically connected to the battery 110 and/or the ECU 106. The one or more storage bin actuators 126 may be positioned at or proximate to the rear portion 134 of the bed 112. The one or more storage bin actuators 126 may be and/or include electric linear actuators, pneumatic and/or hydraulic cylinders, metal springs, and/or gas springs, for example. The one or more storage bin actuators 126 may be configured to automatically move the storage bin 118 between the closed position 312 (marked in FIG. 3) and the open position 908 when activated (e.g., via the ECU 106). For example, a user may use the user device 136 to send an open signal or a close signal to the vehicle 102. The ECU 106 may receive, via the network access device 138, the open signal or the close signal from the user device 136. The ECU 106 may control the one or more storage bin actuators 126 to automatically open or close the storage bin 118 based on the received open signal or the received close signal. In examples, the user may use the user interface 116 and/or other buttons or switches (or other input devices) coupled to the storage bin 118, the lid 202, the tailgate 104, and/or the vehicle 102 to activate the one or more storage bin actuators 126 to automatically open or close the storage bin 118.

Figure 11:
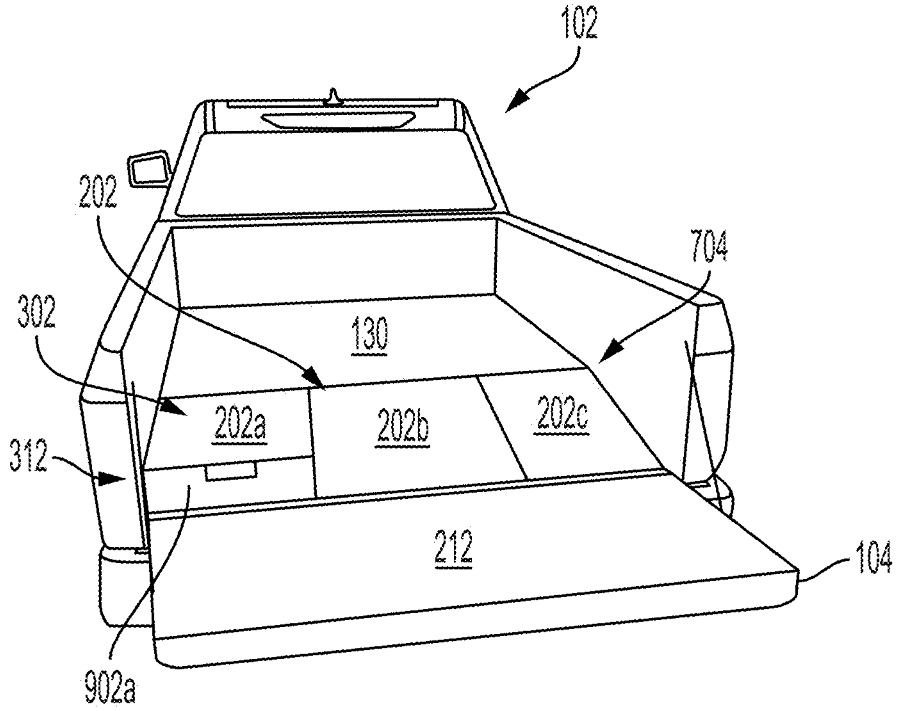
FIG. 11 is a perspective rear view of the vehicle of FIG. 1 including the storage system of FIG. 1 and illustrating sections of a lid of the storage system according to an aspect of the disclosure.

In examples, the one or more rails 1002 and/or the storage bin 118 may be configured such that the storage bin 118 is removable from the vehicle 102. This may enable a user to utilize the storage bin 118 as a removable storage tub, for example. In examples, to place the lid 202 in the ramp position 704 (marked in FIG. 7), the storage bin 118 may be removed from the vehicle 102 such that the lid 202 may pivot downward to the ramp position 704. In examples where the storage bin 118 includes the plurality of drawers 902*a-c* (marked in FIG. 9), the lid 202 may be segmented such that each of the plurality of drawers 902*a-c* is covered by a section of the lid 202. This may enable a user to remove one or more of the plurality of drawers 902*a-c* and place one or more sections of the lid 202 in the ramp position 704 as shown in FIG. 11, for example. FIG. 11 illustrates the first drawer 902*a* in the closed position 312 and a first section 202*a* of the lid 202 in the closed position 302, and with the second drawer 902*b* and the third drawer 902*c* being removed from the vehicle 102. As shown in FIG. 11, with the second drawer 902*b* and the third drawer 902*c* removed from the vehicle 102, a second section 202*b* of the lid 202 and a third section 202*c* of the lid 202 may be in the ramp position 704. In examples, the lid 202 may have one section or more than three sections.

Figure 12:
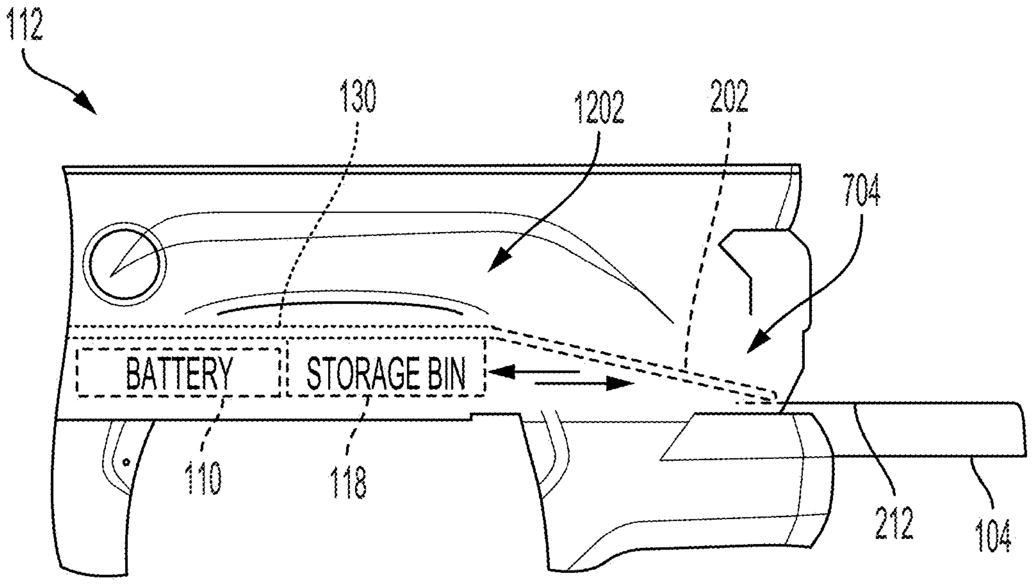
FIG. 12 is a side view of the storage system of FIG. 1 and the rear portion of the vehicle of FIG. 1 with portions of the storage system and/or the vehicle not shown to better illustrate certain features of the storage system according to an aspect of the disclosure.

FIG. 12 illustrates a side view of the bed 112 of the vehicle 102 and the storage system 100 with some components of the vehicle 102 and/or the storage system 100 not shown to better illustrate certain features of the storage system 100. In examples, the storage bin 118 may further may a forward position 1202. In the forward position 1202, the storage bin 118 may be positioned underneath or partially underneath the bed floor 130 and against and/or adjacent to the battery 110. The storage bin 118 may be configured to move or slide forward of the closed position 312 (marked in FIG. 3) with respect to the vehicle 102 to be placed in the forward position 1202. This may enable the lid 202 to pivot downward to the ramp position 704, for example. In examples, the one or more rails 1002 (marked in FIG. 10) may guide the storage bin 118 to the forward position 1202 and/or may manually or automatically lock or hold the storage bin 118 in place in the forward position 1202 such that the storage bin 118 may not unintentionally move between the forward position 1202 and the closed position 312 and/or the open position 908 (marked in FIG. 9).

Referring again to FIG. 1 with continuing reference to FIG. 2, in examples, the storage system 100 may further include one or more electrical outlets (or electrical connectors) 120. The one or more electrical outlets 120 may be configured to receive various plugs and/or electrical connectors of one or more tools and/or one or more electrical devices and provide electrical energy to the one or more tools and/or the one or more electrical devices (e.g., a portable pump, a lamp, a portable heater, an electric stove, a table saw, a drill, a tool battery charger, a mobile phone charger, a laptop charger, etc.). The one or more electrical outlets 120 may be configured to supply electrical energy when the vehicle 102 is powered on and/or when the vehicle 102 is powered off. The one or more electrical outlets 120 may include one or more two and/or three prong outlets and/or one or more USB-A and/or USB-C ports (in examples, the one or more electrical outlets 120 may include other types of outlets and/or connectors).

In examples, the one or more electrical outlets 120 may be electrically connected to the battery 110 such that the one or more electrical outlets 120 may be capable of high voltage output such as 110 volts, 120 volts, 220 volts, or 240 volts (in examples, the one or more electrical outlets 120 may be capable of outputting other voltages such as less than 110 volts or greater than 240 volts) and/or may be capable of outputting numerous voltages such as from 5 volts to 110 volts, 5 volts to 240 volts, and/or 110 volts to 240 volts (in examples, the one or more electrical outlets 120 may be capable of numerous voltage outputs anywhere from below 5 volts to above 240 volts). Moreover, in examples, the one or more electrical outlets 120 may be capable of high-power draws such as up to 1000 watts, up to 2000 watts, or more.

In examples, the storage system 100 may further include one or more lights 128. The one or more lights 128 may be coupled to the rear wall 204, the left wall 208, the right wall 206, the floor 702 (marked in FIG. 7), the front wall 210, and/or the lid 202, for example. The one or more lights 128 may receive electrical energy from the battery 110. In examples, a user may control the one or more lights 128 via the user interface 116 (e.g., activating or deactivating the one or more lights 128 and/or changing a brightness level and/or a color of the one or more lights 128). The one or more lights 128 may include one or more storage compartment lights that may generate light to illuminate the one or more storage compartments of the storage bin 118 when the storage bin 118 is in the open position 908 (marked in FIG. 9) and/or when the lid 202 is in the open position 214. In examples, the one or more lights 128 may include one or more bed lights that are configured to illuminate the bed 112 of the vehicle 102.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A truck bed storage system for a vehicle, comprising:
- a bed floor positioned along a first horizontal plane;
- a battery positioned underneath the bed floor, the battery being configured to store and supply electrical energy;
- a storage bin lying along a second horizontal plane being parallel to the first horizontal plane and positioned rearward of the battery with respect to the vehicle, the storage bin having a plurality of walls defining one or more storage compartments; and positioned along the bottom surface of the truck bed of the vehicle; and
- a lid having:
  - a first closed position, the lid lays along the first horizontal plane to enclose the storage bin when the lid is in the first closed position, and
  - a ramp position, the lid forms an angled surface between the first horizontal plane and the second horizontal plane when the lid is in the ramp position.

2. The truck bed storage system of claim 1, wherein the lid further has an open position, the lid is positioned perpendicular to the first horizontal plane when the lid is in the open position.

3. The truck bed storage system of claim 2, wherein the lid is further configured to slide downward into a cavity when the lid is in the open position to hold the lid in the open position, the cavity being positioned forward of the storage bin with respect to the vehicle.

4. The truck bed storage system of claim 1, wherein:
- the storage bin is configured to be removable from the vehicle; and
- removing the storage bin from the vehicle enables the lid to be placed in the ramp position.

5. The truck bed storage system of claim 1, further comprising a tailgate positioned rearward of the storage bin with respect to the vehicle, the tailgate having:
- an interior surface;
- a second closed position, the interior surface being positioned perpendicular to the second horizontal plane when the tailgate is in the second closed position; and
- a first open position, the interior surface being positioned along the second horizontal plane when the tailgate is in the first open position.

6. The truck bed storage system of claim 5, wherein the storage bin further has:
- a third closed position, the one or more storage compartments of the storage bin being enclosed by the lid when the storage bin is in the third closed position and the lid is in the first closed position; and
- a second open position, the one or more storage compartments of the storage bin being accessible by a user when the storage bin is in the second open position, the storage bin being configured to move or slide rearward of the lid with respect to the vehicle to be placed in the second open position.

7. The truck bed storage system of claim 6, wherein:
- the storage bin further has a forward position, the storage bin being configured to slide forward of the third closed position with respect to the vehicle to be placed in the forward position; and
- the storage bin being in the forward position enables the lid to be placed in the ramp position.

8. The truck bed storage system of claim 6, further comprising one or more locks configured to lock the lid in the first closed position and/or lock the storage bin in the third closed position.

9. The truck bed storage system of claim 1, wherein the plurality of walls of the storage bin include a front wall and a rear wall opposite the front wall, the rear wall being configured to fold towards the second horizontal plane to enable the lid to be placed in the ramp position.

10. The truck bed storage system of claim 1, further comprising at least one of:
- one or more lights electrically connected to the battery and configured to illuminate the one or more storage compartments of the storage bin; or
- one or more outlets electrically connected to the battery and coupled to one or more walls of the plurality of walls of the storage bin.

11. A truck bed storage system for a vehicle, comprising:
- a bed floor positioned along a first horizontal plane;
- a battery positioned underneath the bed floor, the battery being configured to store and supply electrical energy;
- a storage bin lying along a second horizontal plane being parallel to the first horizontal plane and positioned rearward of the battery with respect to the vehicle, the storage bin having a plurality of walls defining one or more storage compartments;
- a tailgate positioned rearward of the storage bin with respect to the vehicle, the tailgate having:
  - an interior surface,
  - a first closed position, the interior surface being positioned perpendicular to the second horizontal plane when the tailgate is in the first closed position, and
  - a first open position, the interior surface being positioned along the second horizontal plane when the tailgate is in the first open position; and
- a lid having:
  - a second closed position, the lid lays along the first horizontal plane to enclose the storage bin when the lid is in the second closed position, a second open position, the lid is positioned perpendicular to the first horizontal plane when the lid is in the second open position, and a ramp position, the lid forms an angled surface between the first horizontal plane and the second horizontal plane when the lid is in the ramp position.

12. The truck bed storage system of claim 11, wherein the lid is further configured to slide downward into a cavity when the lid is in the second open position to hold the lid in the second open position, the cavity being positioned forward of the storage bin with respect to the vehicle.

13. The truck bed storage system of claim 11, wherein:

the storage bin is configured to be removable from the vehicle; and removing the storage bin from the vehicle enables the lid to be placed in the ramp position.

14. The truck bed storage system of claim 11, wherein the storage bin further has:

a third closed position, the one or more storage compartments of the storage bin being enclosed by the lid when the storage bin is in the third closed position and the lid is in the second closed position; and a third open position, the one or more storage compartments of the storage bin being accessible by a user when the storage bin is in the third open position, the storage bin being configured to move or slide rearward of the lid with respect to the vehicle to be placed in the third open position.

15. The truck bed storage system of claim 14, wherein:

the storage bin further has a forward position, the storage bin being configured to slide forward of the third closed position with respect to the vehicle to be placed in the forward position; and the storage bin being in the forward position enables the lid to be placed in the ramp position.

16. The truck bed storage system of claim 14, further comprising one or more locks configured to lock the lid in the second closed position and/or lock the storage bin in the third closed position.

17. The truck bed storage system of claim 11, wherein the plurality of walls of the storage bin include a front wall and a rear wall opposite the front wall, the rear wall being configured to fold towards the second horizontal plane to enable the lid to be placed in the ramp position.

18. The truck bed storage system of claim 11, wherein the storage bin further includes one or more dividers configured to be placed at a plurality of locations within the storage bin to change a quantity and/or a size of the one or more storage compartments of the storage bin.

19. The truck bed storage system of claim 11, further comprising one or more lid actuators configured to actuate the lid to move the lid from the second closed position to the second open position, the one or more lid actuators including one or more springs, one or more gas springs, one or more hydraulic cylinders, and/or one or more pneumatic cylinders.

20. The truck bed storage system of claim 11, further comprising at least one of:

one or more lights electrically connected to the battery and configured to illuminate the one or more storage compartments of the storage bin; or one or more outlets electrically connected to the battery and coupled to one or more walls of the plurality of walls of the storage bin.

* * * * *